United States Patent
Kuykendall, Jr.

Patent Number: 6,031,576
Date of Patent: Feb. 29, 2000

[54] METHOD AND SYSTEM FOR OVER-THE-AIR BROADCAST OF HDTV AND THE LIKE WITH EFFICIENT SPECTRUM ALLOCATION AND BROADCAST AREA SIGNAL DISTRIBUTION

[76] Inventor: Jacob L. Kuykendall, Jr., 25 Hampshire St., Sudbury, Mass. 01776

[21] Appl. No.: 08/925,216
[22] Filed: Sep. 8, 1997
[51] Int. Cl.$^7$ .................................................. H04N 5/38
[52] U.S. Cl. .................... 348/426; 348/724; 370/486; 375/200; 455/3.1
[58] Field of Search ................................ 348/426, 724; 455/3.1; 375/200; 370/486; H04N 5/38

[56] References Cited

U.S. PATENT DOCUMENTS

| | | | |
|---|---|---|---|
| 4,947,244 | 8/1990 | Fenwick et al. | 348/8 |
| 5,513,180 | 4/1996 | Miyake et al. | 370/352 |
| 5,729,825 | 3/1998 | Kostreski | 455/3.1 |
| 5,852,612 | 12/1998 | Kostreski | 375/200 |

OTHER PUBLICATIONS

T.S. Perry, ed., HDTV and the New Digital Television, IEEE Spectrum, Apr., 1995, pp. 34–69.

*Primary Examiner*—Howard Britton
*Attorney, Agent, or Firm*—Perkins, Smith & Cohen, LLP; Jacob N. Erlich; Jerry Cohen

[57] ABSTRACT

A single, common HDTV transmitter transmits a digital composite signal including station signal information of all broadcast stations in a primary market. A broadband signal of e.g., 120 MHz is established, accommodating up to 20 permanent virtual circuits (PVCs) in the broadband signal. The station signals linked to the common transmitter are packetized and digitally compressed and delivered for broadcast in a selected transmission mode such as ATM. Tuning into a broadcaster's signal will be accomplished at a receiver location by a receiver decoding the PVC address permanently assigned to the respective station. The signal is decompressed to its original HDTV format by a receiver, which may comprise a personal computer or video card, to drive the HDTV display and audio system. Each receiver is equipped with a highly directional antenna aimed at a common an antenna broadcasting the composite signal from the common transmitter.

22 Claims, 8 Drawing Sheets

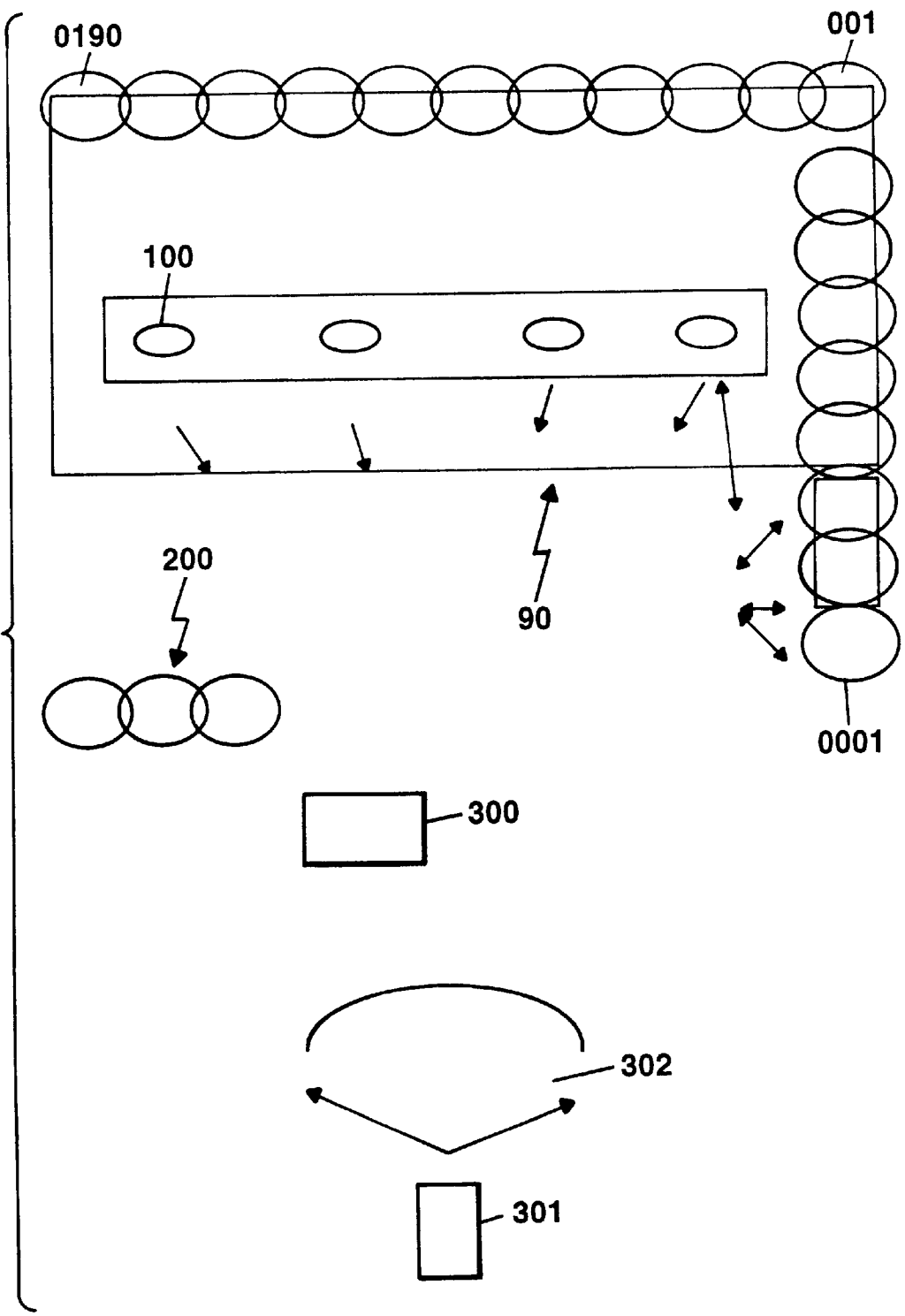

METHOD AND SYSTEM FOR OVER-THE-AIR BROADCAST OF HDTV AND THE LIKE WITH EFFICIENT SPECTRUM ALLOCATION AND BROADCAST AREA SIGNAL DISTRIBUTION

FIELD OF THE INVENTION

The present invention relates to methods and systems for broadcasting high definition television or other signals with efficient spectrum allocation to selected primary, secondary or other broadcast areas.

BACKGROUND OF THE INVENTION

The present invention is discussed in the context of high definition television (HDTV) a digital medium, since it provides substantial benefit in terms of efficient use of broadcast band spectrum and division of geographical territory into which signals are broadcast in to distinguishable primary and lower tier broadcast areas. As further articulated below, more generalized use in over-the-air broadcasting is available.

Analog TV broadcast stations currently are each assigned a bandwidth of 6 MHz, and an operating range limited to the line-of-sight distance (up to 55.5 miles), which equates to the distance that a vhf or uhf signal travels with a transmitting antenna elevated to the practical heights of antenna towers. Each broadcast station maintains a transmitter site within its licensed market area, with the locations typically on the highest elevations of the area, to permit maximum coverage with the lowest investment in property and antenna tower structure. Because of the random location of transmitting towers, TV viewers receive less than optimum signals from over-the-air broadcasters, due to misalignment of the viewer's antenna or due to the low gain of the viewer's antenna, necessary to allow for receiving multiple stations without constantly repositioning the antenna. Low signal strength and low signal to noise ratios due to subscriber antenna positioning and to receiver antenna gain require more elegant processing to compensate for these shortcomings. In the future, anticipated interference between analog and digital transmission within the same frequency bands should provide further reception degradation, as well as allowing the most efficient use of the available spectrum.

A worldwide transition from analog television broadcasting to digital broadcasting will take place. Under a current model for the transition in the United States, HDTV spectrum has been given to incumbent broadcasters at no cost to the broadcasters. The transition will have a duration of 15 years. Also, HDTV frequency allocation will be 6 MHz for each licensed station, occupying the guard band or taboo channels between current analog channels for the 15 year transition period. When analog transmission is discontinued, current analog TV channels 2 through 13 will be reallocated for other non-TV use. The current plan of the United States Federal Communications Commission, FCC, is to allocate broadcast TV bandwidth for HDTV use in the same manner as was used for analog TV, providing a discrete 6 MHz assignment to each broadcaster. There are current geographical constraints on analog broadcasting. A television channel may used to cover a radius of up to 55.5 miles, transmitted from existing transmitting sites. The same frequency may then not then be re-used for a minimum of 155 miles. These same constraints are contemplated under the current United States model for the transition.

The current HDTV implementation plan is to provide each of the incumbent 1500 analog based TV stations a free license for use of 6 MHz of bandwidth designated for HDTV use, that will be located in the guard band adjacent to the existing 6 MHz channel that is now licensed for analog transmission. Starting in May of 1999, and extending through December of 2005, both analog and digital HDTV signals will be transmitted from the same transmitter site as is currently used for analog. Under the current schedule, on Jan. 1, 2006, all analog TV transmission will cease, ending the analog era in broadcast TV history. However, the model does not improve on the historic TV broadcast licensing methodology that was put into place 50 years ago, when the frequency band allocations did not have to be made to the exclusion of others services, as is the case in 1997.

The 250 million analog TV sets that currently exist in the United States will not be able to receive the digital over-the-air signals and will become obsolete with the introduction of digitally TV transmission equipment. Digital TV sets to receive the HDTV signal are estimated to cost are in the range of $2000 for each set by the year 2006. This will result in the cost to the U.S. public that will approach $500 billion for receiving equipment alone under the current model. Estimates are that digital TV broadcast stations will cost $500 to $600 thousand each, a major burden for the 1500 broadcast stations that will need to be converted to handle digital transmissions, for a total of $750 to $900 million. Add to these equipment costs the significant software costs for converting the entire analog based film libraries to the HDTV digital format, will reveal the total cost impact for moving from analog to digital HDTV within a period of one and a half decades. This financial drain on the U.S. economy represents the largest single cost element that will be imposed on the U.S. population over the next several decades. To put this into prospective, the cost impact amounts to 6 to 7 times the total cost for financing and administering the Marshall plan following World War II. The Marshall Plan was funded by sale of surplus military equipment. Here, funding must by underwritten by private citizens and companies.

For all the huge capital expenditures the current model will require, no significant improvement in the broadcasting infrastructure. The program for allocating TV licenses and frequencies was established in the mid 1940s and early 1950s. At that time, the electromagnetic spectrum was not considered a scarce resource. Bandwidth efficient methodologies had yet to be developed. Despite a large body of knowledge that has been developed over the past fifty years for more efficiently utilizing the spectrum, the current model for allocating spectrum for the introducing HDTV is based upon the original frequency allocation plan for and ignores technological advancements that have occurred since then.

OBJECTS OF THE INVENTION

It is therefore an object of the present invention to provide a method and system for implementing HDTV service on a nationwide basis that could result is cost savings of between $100 to $150 billion less than the estimated cost of $500 billion utilizing the current model for conversion from analog to digital television broadcasting.

It is another object of the present invention to reduce the bandwidth required to provide HDTV service nationwide to 120 MHz that will be sufficient to deliver up to 20 HDTV channels within every market area with excellent signal quality.

It is a further object of the present invention to provide a method and system for implementing HDTV service which will provide revenue generation opportunities for the FCC while reaffirming the free spectrum for the primary TV markets for the incumbent broadcast stations.

It is an additional object of the present invention to provide a method and system for implementing HDTV service having the ability to receive both new digital and historic analog signals by common broadcast station equipment during the transition, the ability to handle both United States and European digital TV formats on the same HDTV broadcast equipment and to accept analog based programming materials in their original magnetic and optical based storage formats without conversion in advance to the HDTV format, for transmission to subscribers as compressed, packetized ATM or other standard packet format for over the air, and to provide a non-disruptive ability to reallocate frequencies after the phase out of analog TV broadcasts without affecting viewers' HDTV receiving equipment or the broadcast transmitter equipment.

It is yet another object of the present invention to provide a method and system for receiving HDTV formatted over-the-air signal with analog TV sets, through set-top boxes, video cards or modules that will provide HDTV to analog conversions.

It is also another object of the present invention to provide a method and system for receiving a method and system for implementing HDTV service which will provide low cost alternatives for receiving high bandwidth internet and intranet signals through over-the-air delivery channels.

It is still a further object of the present invention to provide a method and system for implementing HDTV service which will allow 100% of viewers up to 20 high-quality "channels" in every market nationwide, even in sparsely populated markets.

It is another, general object of the present invention to provide a method and system for implementing HDTV service which will reduce the cost of HDTV receiver equipment by virtue of utilizing generic PC based equipment, whose price has continually dropped with the passage of time.

It is another object of the present invention to provide a method and system for receiving HDTV service over-the-air, from satellite TV or from fiber or coaxial cable on the same receiving platform or TV receiver equipment.

It is another object of the present invention to provide a method and system for implementing HDTV service which will allow establishment of a primary market area covering, for example, a geographical area of approximately 17,662 square miles (within a radius of 75 miles) with a license provided to incumbent broadcasters at no charge.

It is another additional object of the present invention to provide a method and system for implementing HDTV service which in addition will allow establishment up to five contiguous market areas of, for example, each the size of a primary market area, and each being subject to a "per market" license fee levied by a licensing authority such as the FCC.

It is also another additional object of the present invention to provide a method and system for implementing HDTV service which will further provide for establishment of ten remote markets of, for example, a primary market area, each also subject to a "per market" license fee.

It is another general object of the present invention to provide a method and system for implementing HDTV service which reduce broadcast transmitter operating costs as much as 75% to 80% as a result of the use of common shared transmitter facilities.

It is also a general object of the present invention to provide a method and system for implementing HDTV which provide broadcasters the ability to deliver service to the above-described contiguous and remote markets.

It is further general object of the present invention to provide a method and system for implementing HDTV service which will provide a seamless means for transferring from 100% analog to 100% digital broadcasting, without disruption or undue signal interference.

It is still another general object of the present invention to provide a method and system for implementing HDTV service which will enable increasing the transmission range of a broadcast station from the current 55 miles for a primary broadcast area to 75 to 80 miles with no additional power requirement and still meeting the need to avoid interference with signals in other primary broadcast areas.

It is another object of the present invention to provide a method and system for implementing HDTV service which will provide for reliable over-the-air reception of local television stations and free up channels in cable systems now dedicated to "must carry" service and provide a convenient means for satellite subscribers to access local stations.

It is still a further additional object of the present invention to provide a method and system for implementing HDTV service which allows utilization by the same network of digital broadcast stations to deliver digital audio programming, which audio programming may be received on the same user receiving platforms or on audio platforms using the same signal format

SUMMARY OF THE INVENTION

Briefly stated, in accordance with the present invention, all licensed stations in a primary market send their broadcast signals to a single broadcast site established for transmission of all channels in a primary market. Rather than assigning each station a discrete 6 MHz bandwidth, a broadband signal of 120 MHz is established, accommodating up to 20 permanent virtual circuits (PVCs). Within the broadband signal, each channel's transmission is packetized in a digital compressed format from a single (with hot standby redundancy) transmitter site. Each station in the primary broadcast area is allocated program addresses on an asynchronous transmission mode (ATM) format, within the wideband facility. The address allocation is either at full bandwidth or as a compressed signal utilizing an industry standard compression format, such as the MPRG-2, for insertion into one of the assigned PVCs by the common HDTV broadcast facility. The common HDTV facility will then either pass on the compressed signal or will compress any uncompressed signals from a broadcast station, on the PVC permanently assigned to the station. Tuning into a broadcaster's signal will be accomplished at the receiver location by decoding the PVC address permanently assigned to the respective station. The signal is decompressed to its original HDTV format to drive the HDTV display and audio system. Providing PC circuitry cooperating with industry standard video cards or modules in the receiver provides for the receiver's HDTV capability.

BRIEF DESCRIPTION OF THE DRAWINGS

The invention is pointed our with particularity in the claims forming the concluding portion of the specification. The invention, both as to its organization and manner of operation, may be further understood by reference to the following description taken in connection with the following drawings.

Of the drawings:

FIGS. 8 and 9 is a diagram representation of a possible patterns of market coverage of large areas.

DESCRIPTION OF THE PREFERRED EMBODIMENTS

Figure 1:
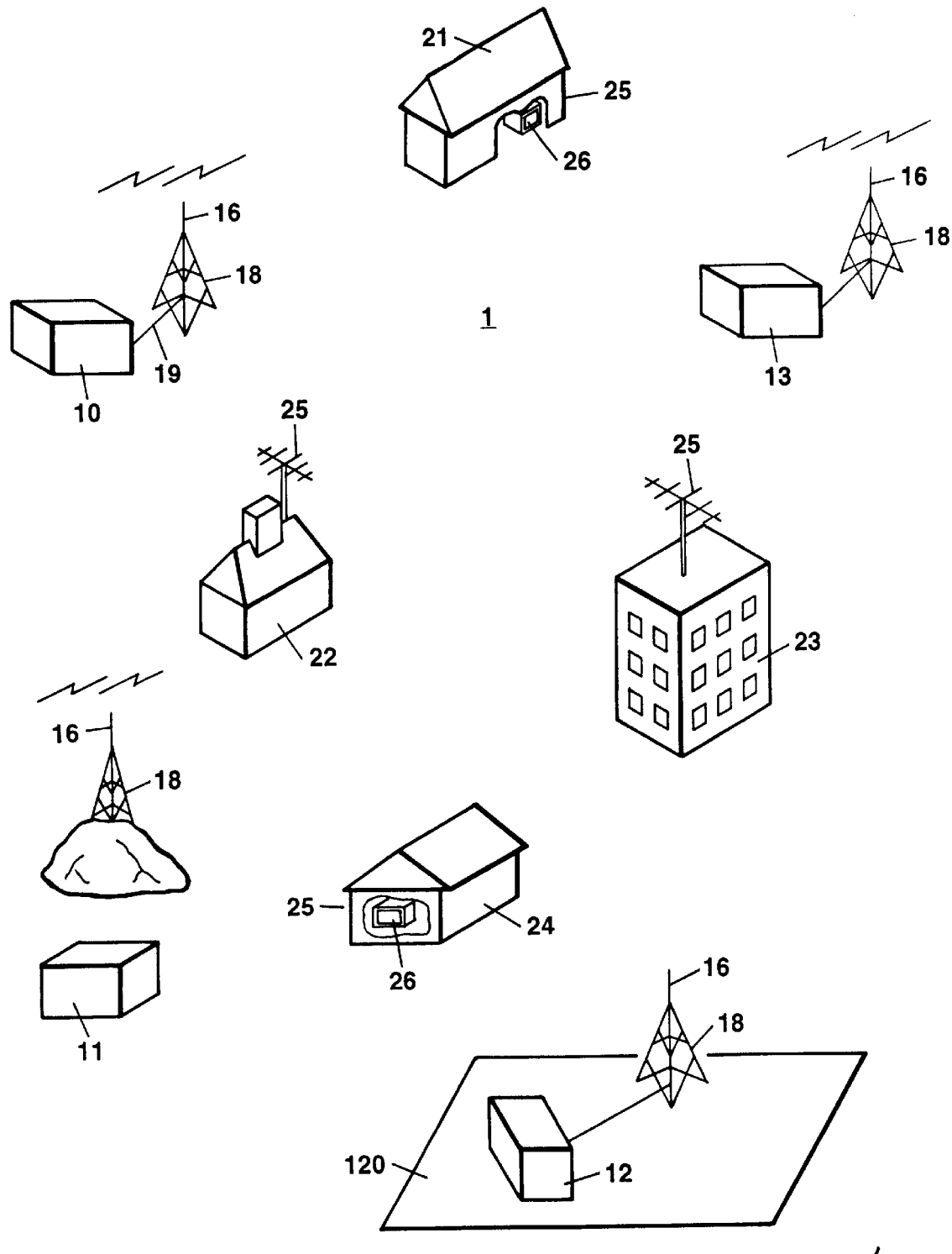
FIG. 1 is a pictorial and block diagrammatic representation of a prior art broadcast transmitter arrangement for a typical market areas as they currently exist for analog broadcast and are planned for HDTV broadcast.

In order to fully understand the embodiments of this invention, it is first necessary to understand how the existing terrestrial over-the-air TV signals are distributed to subscriber locations. In the various drawings, the same reference numerals are used to denote the same components.

FIG. 1 is a pictorial and block diagrammatic illustration a of typical, prior over-the-air TV broadcast arrangement in a primary market area 1. Four broadcast stations 10, 11, 12 and 13, each providing a station signal, are illustrated for the sake of description. As will be noted further with respect to FIG. 4 below, the broadcast station 12 is located on a site 12a. Differing numbers of broadcasting stations exist in different primary market areas 1. The extent of the primary market area 1 does not have precise borders, but is defined by the composite range of the broadcast stations 10–13 operating in accordance with the regulatory restraints of a licensing authority having jurisdiction. In the United States of America, the licensing authority is the Federal Communication Commission (FTC). Each of these broadcasting stations utilizes a transmitting antenna 16 located on a tower 18. The transmitting antenna 16 is coupled to each station 10, 11, 12 or 13 by a feed means 19. Four TV subscriber locations 21, 22, 23 and 24 are illustrated, each using its own antenna 25 and receiver 26 coupled to the antenna 24. A nominal primary market area 1 may include millions of television receivers. The antenna 25 may comprise a roof top antenna, "rabbit ears," or other television receiver antenna. This is a typical arrangement for existing analog broadcast stations and for the currently planned future HDTV broadcast stations' locations. Customarily, tower 18 location is selected based upon the availability of land on usually elevated vistas. One tower 18 may support a number of different antennae, generally for different services, but the convention of one antenna per station is followed. The pointing of multi element outside receiver antennae 25 is typically randomly selected; few antenna are mounted on rotators to face each an antenna 16 of a broadcast station to which its receiver 26 is tuned. Indoor antenna angular displacement adjustment is limited to imprecise movement of "rabbit ears." The general consuming public is not aware of the possibility of tuning rabbit ears to the wavelength of the signal being received. The prior art does not teach a reason for locating broadcast stations in any logical order in the past.

Figure 2:
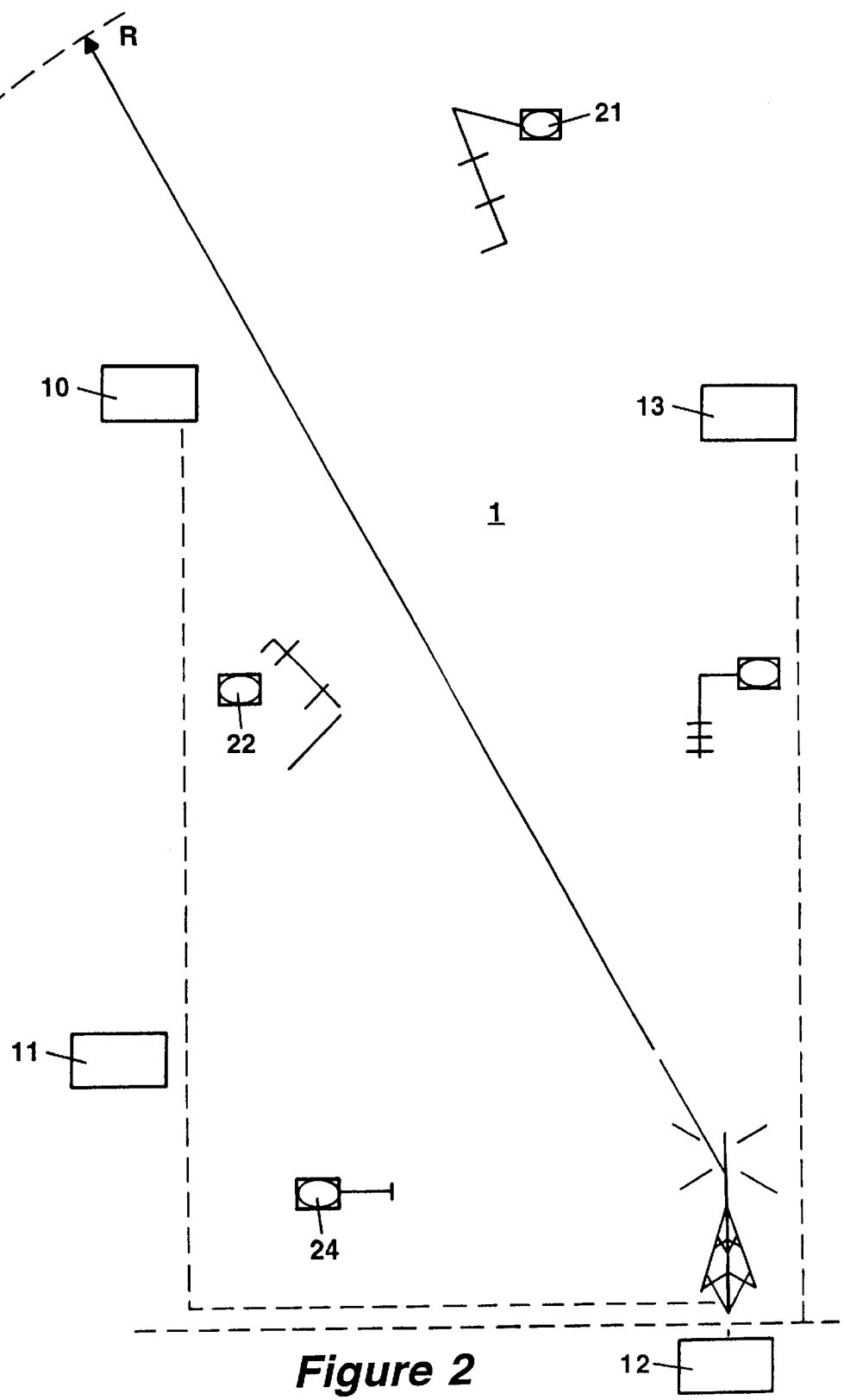
FIG. 2 is a pictorial and block diagrammatic representation of the broadcast transmitter arrangement for a typical market area utilizing the present invention.

FIG. 2 illustrates a system in accordance with the system and method of the present invention. In a primary market 1, means are provided for coupling the signals of the broadcast stations 10–13 to a common broadcast station. For purposes of the present description, the broadcast station 12 is selected as the common broadcast station. One tower 18 supports one antenna 16 which transmits the signals from each of the stations 10–13. The broadcast station 12 broadcast signal is sent, as further described below, as a wideband digital signal utilizing a packetized format such as the constant bit rate ATM currently used for video transmission in cable applications. A bandwidth of 120 MHz will accommodate 20 virtual compressed HDTV signals, as 155 Mhz will accommodate 100 virtual circuits for digital compressed conventional analog TV over cable systems with existing technology. In this arrangement, as further described with respect to FIG. 4, HDTV program stations 10, 11 and 13 will deliver their signals to common broadcast station 12 via fiber or point-to-point over the air transmission, for broadcast by station 12.

In this arrangement, viewer antennae 25 may be extremely directional and permanently pointed toward the broadcasting station 12. It will be unnecessary to re-adjust the antenna 25 after it is installed. Antennae 25 with an angular range of vision of from 2 to 3 degrees, which have extremely high gain may be used. Such an arrangement will accomplish three objectives: 1) it will improve the signal quality due to higher signal to noise ratio, 2) it will extend the range of the transmitter reach from the current 55 miles to 70 to 80 miles with the same transmit power, 3) it will minimize interference from undesirable signals because of the very narrow signal selection capability of the receive antenna. The antenna will ignore signals that are not directly in line with its look angle. As the result, the total spectrum required to support a nationwide system will be minimized. It will not be necessary to provide buffer zones between market areas, as required in the current plan. As the radius of the serving areas can be extended to 70 to 80 miles, interference between the transmitter in each market area will be reduced. With an average 75 mile radius or 150 mile diameter of a primary market area, the entire continental U.S. may be covered with just 200 shared HDTV broadcast stations, as opposed to the 1500 that will be required under the current plan.

Figure 3:
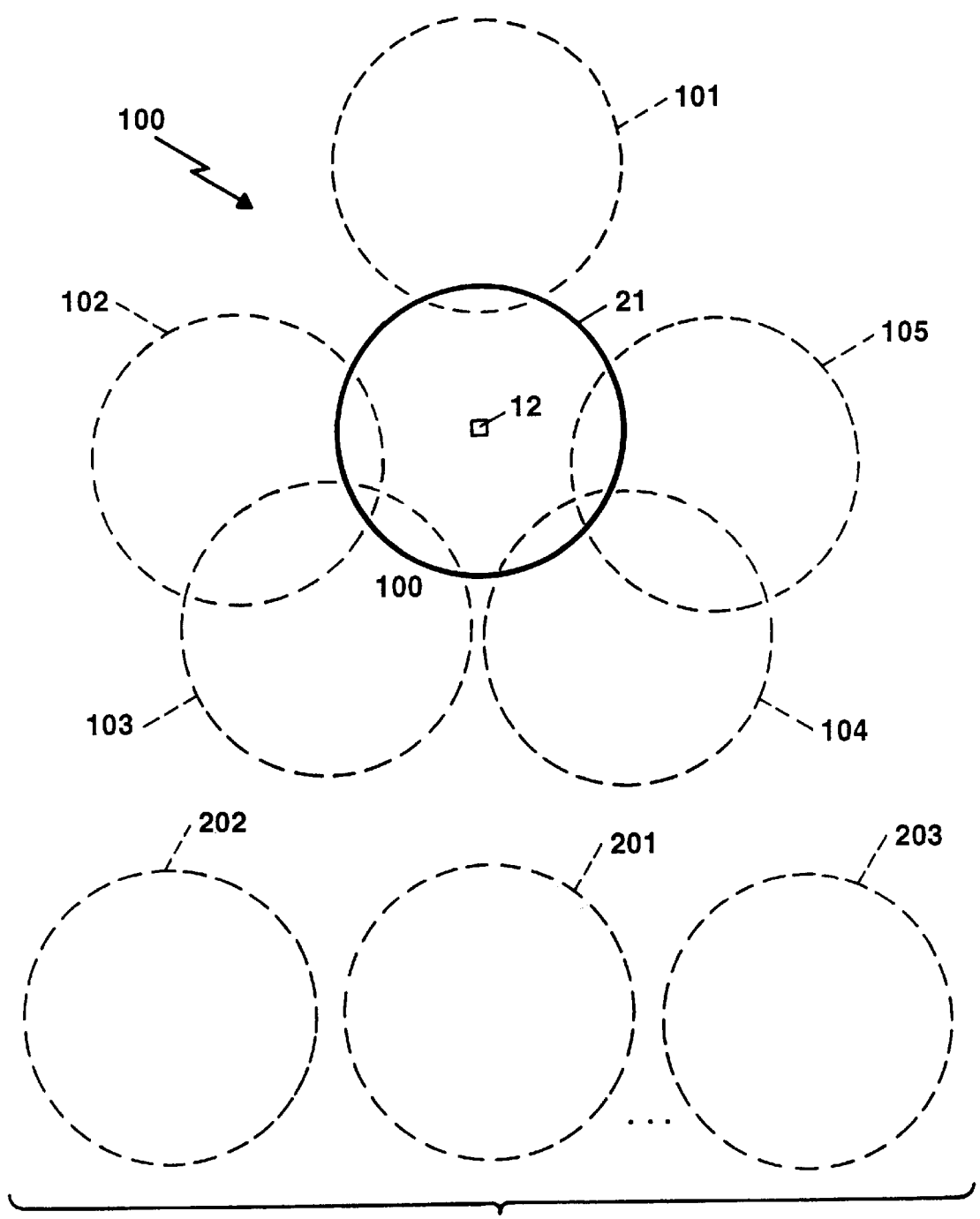
FIG. 3 is a pictorial and block diagrammatic representation of a transmitter arrangement covering several market areas, showing typical station coverage over a large geographical area.

FIG. 3 depicts a geographic area that contains one primary HDTV market 1, five contiguous markets 101, 102, 103, 104 and 105 plus representative remote markets 200, 201, and 202. HDTV program stations in primary market 1 may each have their signal transmitted in, for example, five markets 101, 102, 103, 104 and 105. Additionally HDTV broadcast stations in market 100 may have their signals transmitted in, for example, up to 10 remote markets, 200, 201. This arrangement will encourage stations in major market areas to transport their signals for over-the-air transmission in remote markets, that are now poorly served due to population density too low to support multiple stations. A similar arrangement will be available for all HDTV stations nationwide. Non-specific contiguous markets or contiguous markets in the aggregate will be referred to as contiguous markets 100. Non-specific remote markets or remote markets in the aggregate will be referred to as remote markets 200.

By creating contiguous and remote market areas, the present invention provides revenue opportunities for licensing authorities. In the United States, incumbent broadcasters are to keep the rights to broadcast in their primary market areas 1 with no license fees. However, the FCC can charge fees for use of contiguous and remote markets.

Figure 4:
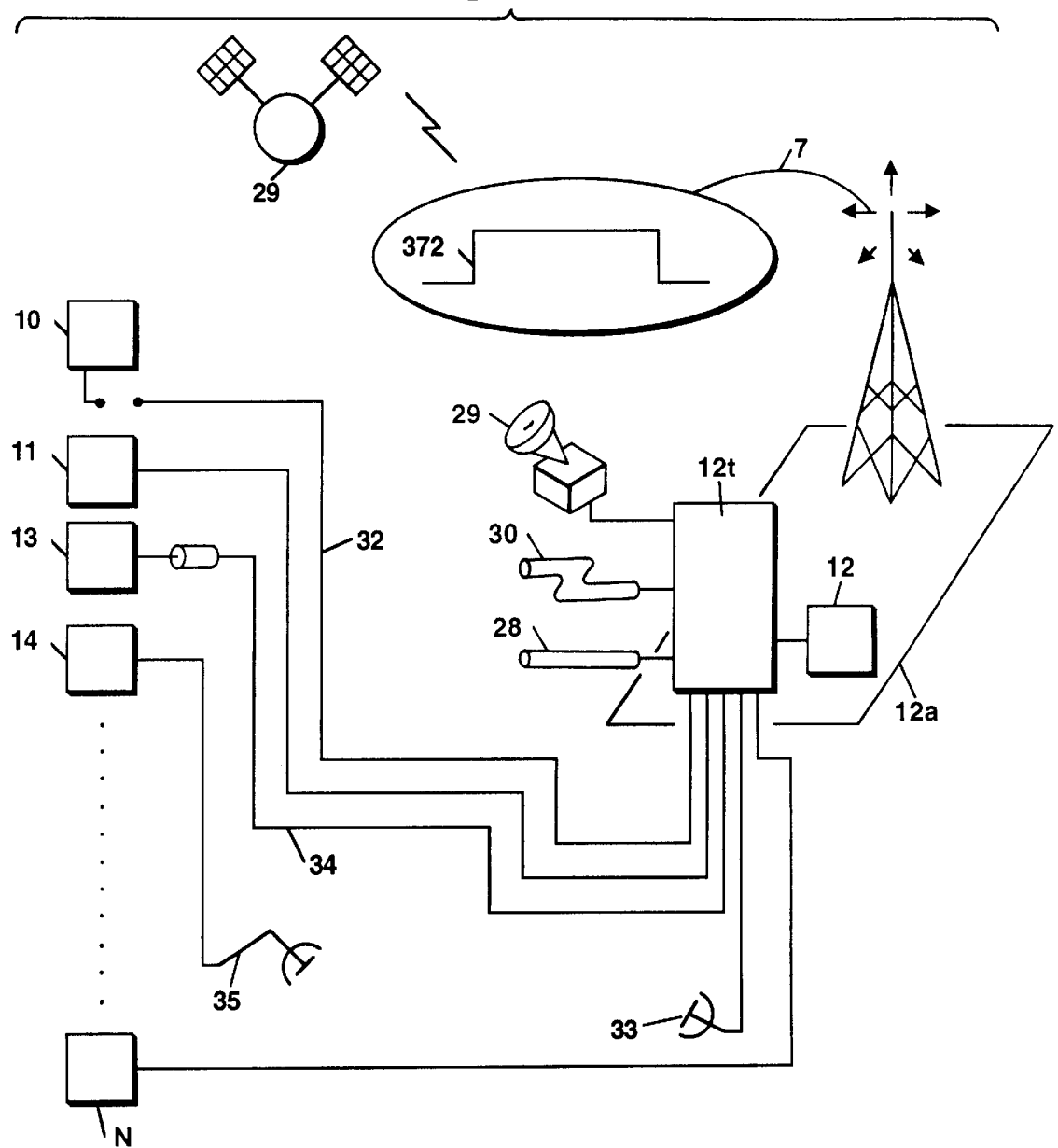
FIG. 4 is a pictorial and block diagrammatic representation of geographically separated broadcast studios in a primary market and their connection to a common, shared over-the-air broadcast transmitter.

FIG. 4 is a pictorial and block diagrammatic representation of the geographically separated broadcast studios and the common shared over-the-air broadcast transmitter site for digital TV transmission including High Definition TV formats. The present invention combines the digital signals of multiple geographically separated TV broadcast stations 10–13 for over-the-air transmission as a single composite wideband signal. Although there is no physical limitation as to the number of TV broadcast signals that this invention will accommodate, the historic upper-limit of TV broadcast stations in a given market in a major metropolitan area in the U.S. is 20 or less. In sparsely populated TV market areas, the number of broadcast stations can be one or two. The TV stations served by the shared transmitter site 12a in the present illustration are stations 10, 11, 12, and 13 through N, where is the total number of broadcast stations being commonly transmitted from the broadcasting station 12. N may also have a value of 1, 2, 3 or 4.

Physical transmission paths between the broadcast studios 10—N and the shared broadcasting site 12a may be via fiber 33, coaxial cable 34 or point-to-point over-the-air microwave means 35. With this methodology, other broadcast their own over-the-air broadcast facilities. The digital TV signal, containing video and audio information in High Definition TV format or other digital convention, delivered to the shared broadcast station 12 from each of the broadcast studios 10 through N will be in the format of a digital broadcast high definition TV signal, in either an uncompressed or compressed format. At the shared broadcast site 12a, each of the TV signals from studios 10 through N will be compressed, if not already compressed before being delivered, and packetized with the studio packet address added to identify the originator of the broadcast signal. Each HDTV broadcast station 10 through N studio signal will occupy a permanent virtual circuit (PVC) within a composite signal 37 consisting of compressed, packetized signals from all of the broadcast studios 10 through N will then be directed to the shared broadcast antenna 16 and transmitted over-the-air at the station authorized power output level. The packetizing format for the composite signal 37 may include the packetizing digital format in the asynchronous transfer mode (ATM).

In accordance with the present invention, the common broadcasting may transmit other services as well, fed, for example, to any of the broadcasting stations 10 through N.

In the present exemplification, additional signals are delivered to the broadcast station 12. These signals may comprise HDTV digital signals from a cable system 28, whether it be optical fiber or coaxial based cable, or from a direct broadcast satellite TV system 29 or internet or intranet bus 30 that utilizes the same standard ATM digital format or other compatible format. The links 32, 33 and 34 are each bidirectional. Consequently the broadcast station 12 may act as a collection point for international or national news relay stations and forward signals to the other stations 10 thorough N.

Figure 5:
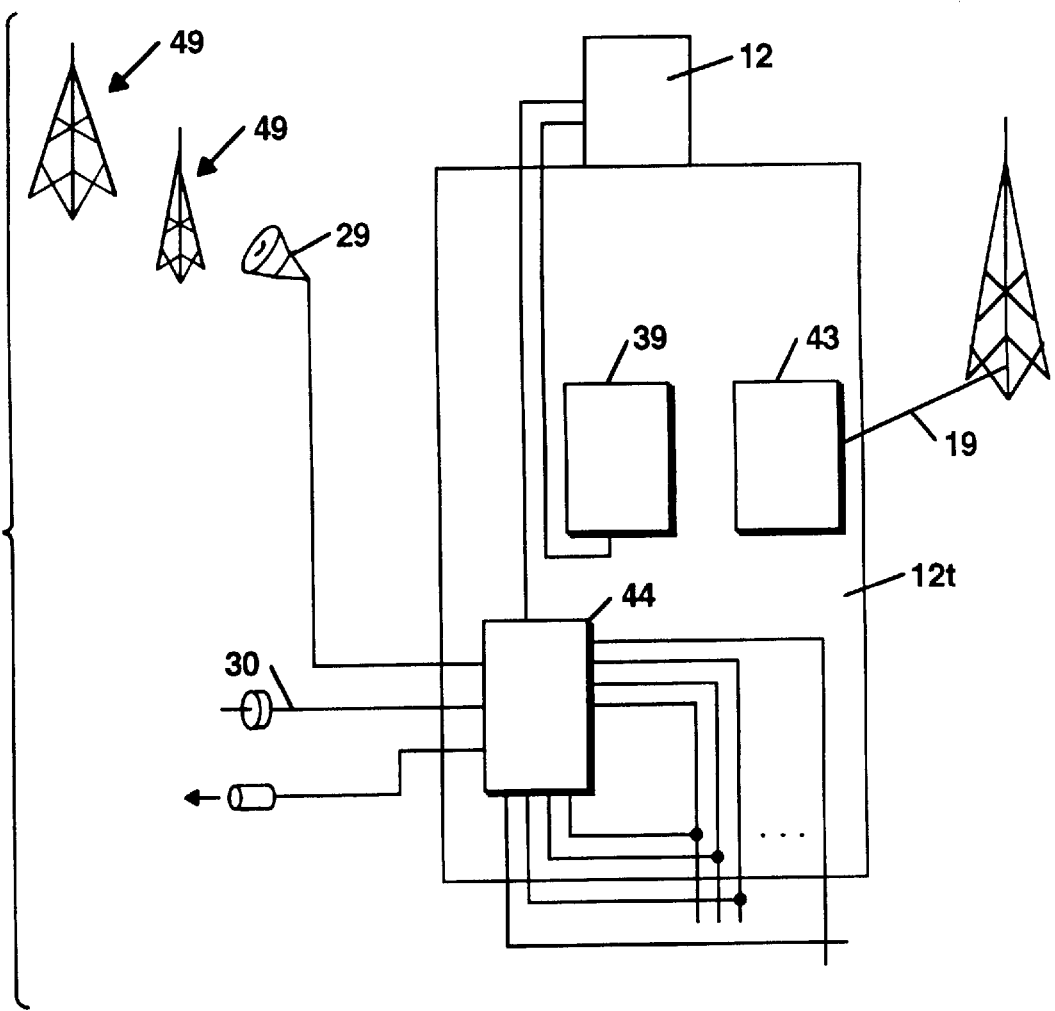
FIG. 5 is a pictorial and block diagrammatic representation of a shared digital transmitter with format conversion facilities.

FIG. 5 depicts in block diagrammatic form a format translation facility 39 included within a transmitter 12t within the shared broadcast station 12. The format translation facility 39 contains known circuitry whose capabilities will include ATSC, DVB, NTSC, PAL and SECAM as inputs and will output digital packetized messages including the ATM format. The information content of the video and audio signals undergo concentration utilizing real-time compression, for example including the MPEG-2 protocol, prior to over-the-air transmission within a compression module 43.

A receiver and relaying facility 44 is provided for reception and relay of signals from the satellite system 29, and optical fiber or cable inputs 28 and 30. In this manner, relayed signals can be transmitted to other stations 10 through N in the primary market area 1. For purposes of the present description, in this context, the stations 10 through N are described as a market network. Distant common broadcasting stations 49 may also be linked to the common broadcasting station 12 by known means as described above, and form a multi market network.

Figure 6:
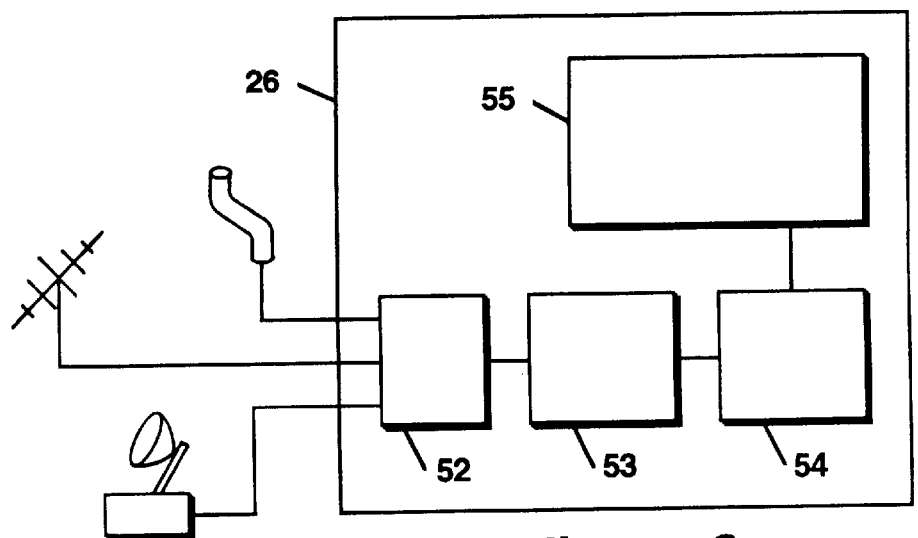
FIG. 6 is a block diagrammatic representation of a receiver for the reception of a packetized digital TV format signals.

Reference is now made to FIG. 6 in order to fully describe the reception of the digital compressed packet signal 37 by a digital TV set. The approach for providing a signal to an off-the-shelf digital TV 26 receiver is similar to the historic approach for utilizing analog over-the-air TV receivers for the reception of cable signals through set-top boxes. With this historic approach, both analog based and digital based TV signals have been extracted from a wideband signal carried on a cable, either fiber or coaxial, and presented to the TV set on a channel vacant to the local environment.

The digital compressed, packetized signal is received on the antenna 25 that may be of high. The receiver antenna 25 will only need to point to one broadcast transmitter antenna 16 to receive all of the stations for the market area 1. The signal 37 will have very high signal to noise ratio due to permanent alignment and due to being able to utilize high gain antennae 25. As the result of the high gain and narrow receiving angle of the antenna, interference from transmitter sites of adjacent market areas will be greatly minimized or eliminated. Transmitting HDTV signals from one common site 12a in a TV primary market area 1 will minimize the effect of co-channel interference on analog channels, through angular separation and through the ability to position HDTV broadcast signals in non-interfering portions of the spectrum.

The signal 37 will pass from the antenna 25 to the RF section 52 of the receiver 26. The composite signal 37 will be amplified via a wideband RF amplifier (a well-known component of RF sections) that will process the total bandwidth designated for the N channels of the market area 1. Utilizing conventional local oscillators and mixers (well-known components of RF sections), the RF wideband signal will be converted to a lower frequency band that can then be processed with conventional digital components. The amplified wideband signal will then be passed on to the digital processing section 53, consisting of the known depacketizing circuitry, where the signal from a specific station 10 through N will be extracted and passed on to the decompression module where the signal will be expanded. The reconstituted digital signal will then passed on to a digital TV receiver 54. The digital TV receiver delivers a signal to an HDTV display 55. The display 55 may be an integral part of the receiver 26 or may comprise a large wall display. The signal 37 is processed in real time. "Real time" as used herein includes near real time, taking into account the delays inherent in depacketizing video and audio signals. The digital processing section 53 may comprise a personal computer (PC) programmed for processing the wideband digital signals. Such programming is accomplished by presently known means. Additionally, the personal computer may comprise a well-known video card.

The receiver 26 as illustrated in FIG. 6 may also receive HDTV digital signals from a cable system 57, whether it be optical fiber or coaxial based cable, or from a direct broadcast satellite TV system 58 that utilizes the same standard ATM digital format or other compatible format. By utilizing packetized digital formats for the transmission of TV content, the packet addresses that are inherent in the management of the information provide a means of providing accountability for the authorized reception of the material. Well established security, accounting and content management technologies that have been developed for the secure management of data becomes available to also manage the flow of digital TV content, which allows this invention to leverage the body of knowledge developed for secure data communications and for delivering pay-per-view services. The receiver 26 may also process signals of other services as transmitted by the broadcast station 14 as described with respect to FIG. 4. Pay-per-view and other data will be referred to in the present specification as "station specific data" since it may or may not be included in any given station signal.

Figure 7:
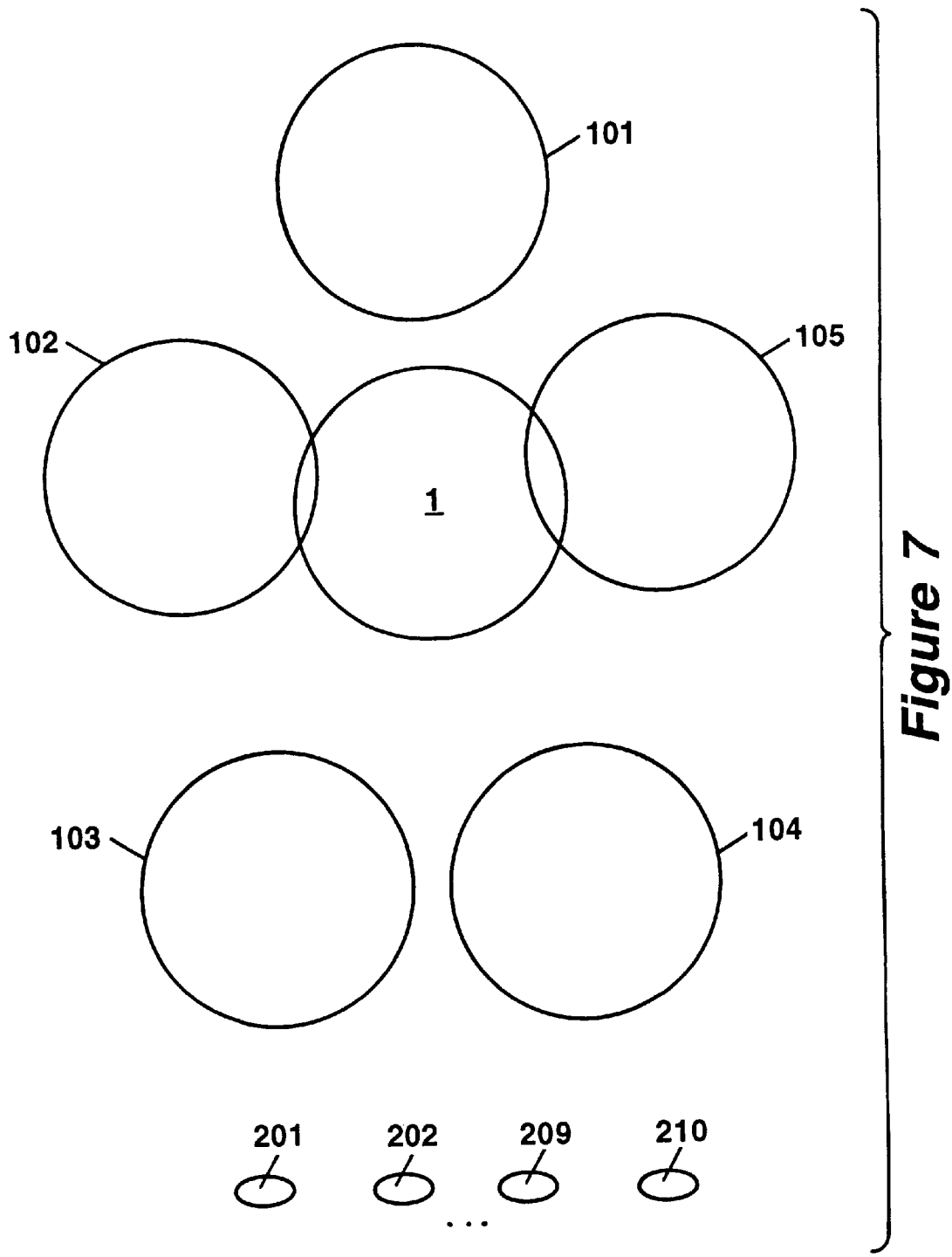
FIG. 7 is a pictorial and block diagrammatic representation of a subscriber location for over-the-air reception of a packetized digital TV format with a PC platform, as well as reception of signals from other sources.

Reference is now made to FIG. 7 to describe how TV marketing areas may be defined for purposes of more effectively utilizing the spectrum for the delivery of digital TV. The radius of a primary market area 1 can be increased from the current 55 miles to 75 miles, as the result of utilizing high gain receiver antennae 25. The actual size of the defined TV market area can be adjusted by providing higher gain antennae 25 to subscribers at the outer limits of the circle areas shown. The need to allow a guard band between shared transmitter sites is eliminated due to virtual elimination of inter-station interference by use of highly directional receiver antennae 25. The re-definition of TV market areas allows an opportunity for the FCC to charge a fee for TV stations to deliver program outside of the primary marketing areas 1. The definition of a primary market area 1 is the area covered by the signal of a broadcast transmitting station 12, typically up to 55 miles in radius for analog broadcast stations. This invention enables utilizing a common multi-signal digital transmitting site for each TV market area, thus allowing the possibility of permitting a broadcast studio to transmit in multiple TV markets.

A broadcast station 10–13 located in primary TV market 1, where the station holds a free digital license based upon licensing authority grants, in the United States, 1996/1997 FCC rulings, could be allowed to deliver its signal to contiguous markets 101, 102, 103, 104 and 105 for a contiguous market license fee. Similarly, the broadcast stations 10–13 could each be granted a license to deliver its signal in up to ten remote markets 201 through 210 in consideration for a remote market license fee. This opportunity allows the delivery of as many as 16, or even more, over-the-air broadcast signals, to every market within the continental U.S., based upon the suggested licensing arrangements developed herein.

Figure 8:
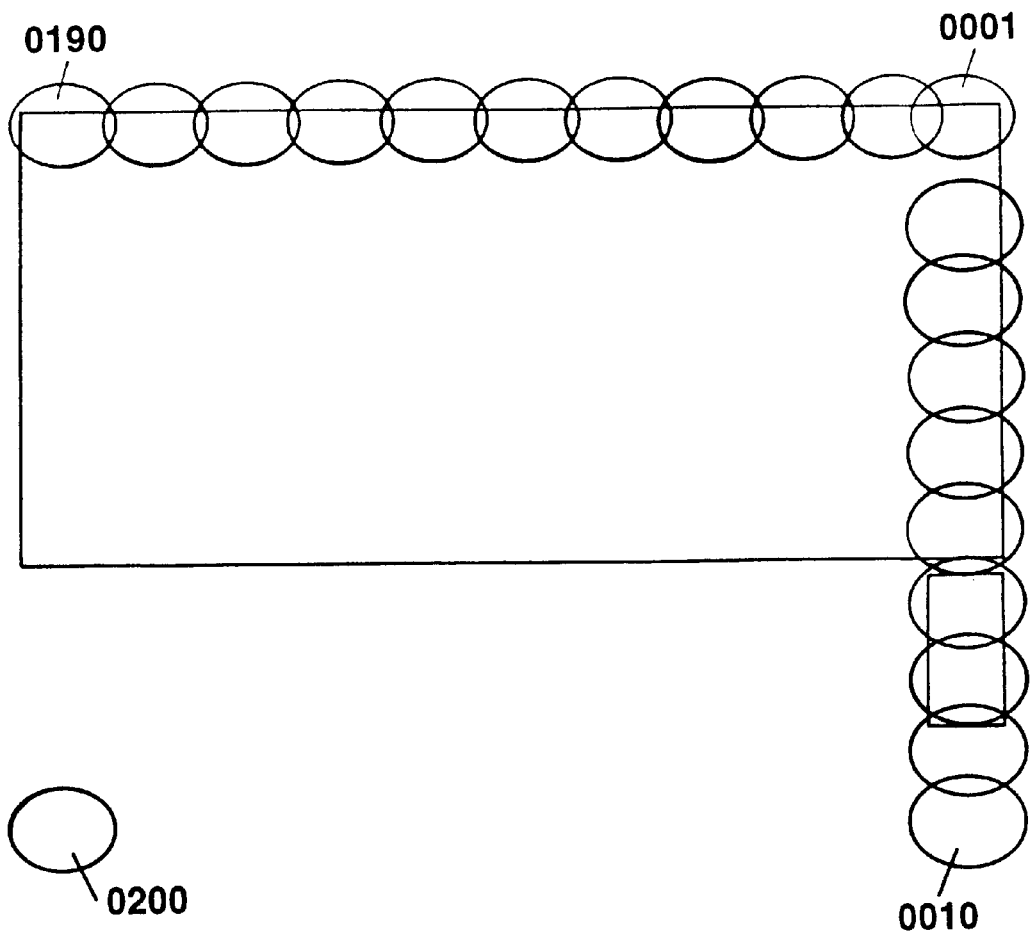

FIG. 8 is a diagram used to describe how the continental United States 80 may be covered utilizing approximately 200 shared broadcast transmitter stations 0001 through 0200. For reference, the current analog TV broadcast network consists of approximately 1500 individual broadcast stations, each operating a broadcast transmitter. The typical TV market area based on this invention will have a diameter of approximately 150 miles, making it possible to provide total coverage with a network of transmitters that number ten north to south and twenty east to west, totaling 200. The location of population centers will influence the actual location of the shared transmitter sites. This arrangement eliminates the need to provide geographical space between transmitter sites transmitting within the same frequency band, since the subscriber high gain antennae will provide angular signal selectivity that ignores signals from contiguous TV market areas. The packet address of each of the 1500 digital broadcast studios will managed on a national numbering scheme.

By eliminating the need for guard bands, as the result of broadcasting composite digital signals and eliminating the need to provide geographic separation between transmitters on the same frequency band, with this invention it will be possible to provide as many as 20 HDTV channels in each of the 200 market areas in the continental U.S., within a total bandwidth of 60 MHz. For comparison reasons, the current analog service requires channels from 2 through 68 and require 402 MHz, plus the unused guard bands or taboo channels of 6 MHz each between channels 2 through 13, amounting to an additional 72 MHz, for a total of 474 MHz of bandwidth. The present invention will free up 414 MHz of frequency spectrum for re-allocation for other purposes. The method disclosed herein is 7.9 times more bandwidth efficient than the current analog system, using MPEG-2 compression only. Even higher efficiencies may be achieved with known compression technologies that are superior to MPEG-2 and with future compression technologies.

FIG. 9 is a diagram describing a network 90 for interconnecting digital broadcast studios with their respective licensed contiguous market areas 100 and remote market areas 200. The packetized digital compressed signals 37 will be transferred from the origination broadcast station 12 to the distribution network 90 that will comprise a terrestrial network or a hybrid terrestrial and satellite based configuration. Interconnections to contiguous TV markets 100 could utilize fiber, copper or coaxial based local networks 300 and distribution to remote markets 200 could use satellite based networks 301, 302. The interconnecting networks 301 and 302 serve the dual role of providing a delivery system to local TV stations for national broadcast affiliations such as CBS, NBC and ABC. The hybrid distribution network 300 also serves the role of providing a nationwide network for collecting locally generated programming from local live news coverage that receives national distribution.

Although this invention has been described with reference to particular embodiments, it will be understood to those skilled in the art that this invention is also capable of further embodiments within the spirit and scope of the appended claims.

I claim:

1. A method for producing a composite HDTV television signal for broadcasting a plurality of digital broadcast stations from a common transmitter at a common broadcasting station in a market area, each broadcast station producing a station signal, within a spectrum band of limited width compared to analog broadcast spectra which width is in correspondence with a total number of stations in a market after each station signal has been digitally compressed, comprising the steps of:

provide a transmitter for producing a wideband signal having the width of the spectrum band;

providing station signals from the broadcast stations to the transmitter;

providing width of the composite signal in accordance the spectrum band;

combining the station signals to provide a packetized, digital, compressed format for transmission in a selected format within; and creating within the digital format at least a permanent virtual signal circuit having a virtual channel address for each TV studio signal.

2. The method of claim 1 wherein the step of combining the station signals further comprises producing the packetized digital compressed format in asynchronous transfer mode.

3. The method according to claim 2 wherein the steps of providing station signals further comprises the step of selectively encoding station specific data in a selected channel.

4. The method for receiving a composite signal produced in accordance with claim 1 comprising the steps of providing a digital television receiver for receiving the composite signal, and decoding the virtual channel address of a broadcast station selected for viewing.

5. The method of claim 4 further comprising the step of decompressing the composite signal.

6. The method of claim 5 wherein the step of providing a television receiver comprises providing a personal computer programmed for processing the composite signal.

7. The method of claim 5 further comprising providing the personal computer programmed for decoding of multiple broadcast formats in real time.

8. The method according to claim 7 for receiving a composite signal having station specific data in a selected station signal further comprising the step of providing the personal computer programmed for responding to station-specific data encoded in a station signal.

9. A method for forming a multi-market network including common digital broadcast stations, each in a respective primary market, comprising the steps of:

linking the common broadcast stations via linking means;

compressing station signals and including them in a digital packetized format prior to linking them from one common broadcast station to at least any other; and and providing multiple virtual paths between common broadcast stations by utilizing the same digital packetized format for transmission in each link.

10. The method of claim 9 wherein at least one said common broadcast station relays internet or intranet signals for providing high speed data rate access to internet or intranet networks over the multi-market network wherein the step of linking comprises downloading from the common broadcast station to the multi-market network at video speeds.

11. The method of claim 10 further comprising the additional step of uploading from the multi market network to a common broadcast station at speed capacity of the multi-market network.

12. The method according to claim 6 further comprising the step of providing the output of said receiver to drive a high resolution monitor.

13. The method according to claim 1 for transmitting digital and analog station signals from the common transmitter further comprising the steps of receiving at least an analog station signal, digitizing and compressing the analog signals at the shared transmitter site, whereby digital televisions and personal computers equipped with digital video cards can receive analog programming without requiring additional capabilities at a receiver location.

14. The method according to claim 1 wherein at least one station signal is in a diverse format and further comprising the step of converting the station signal in the diverse format and packetizing the station signal in the composite signal, whereby a plurality of broadcast formats including but not limited to ATSC, DVB, NTSC, PAL and SECAM may be delivered to a multi-market network.

15. A method of defining a primary market for a plurality of broadcast stations, each providing a station signal, comprising the steps of;

providing a common transmitter having a broadcast radius, the broadcast radius corresponding to a primary market area licensed by a licensing authority;

linking each station signal to the common transmitter;

combining the station signals in to a composite signal, whereby eliminating guard frequencies between broadcast stations are not required;

combining both analog and digital broadcast station signals in a composite signal; and locating the central transmitting facility so that antennae of receivers in the broadcast radius can aim at the common transmitter facility.

16. The method according claim 15 further for receiving the composite signal produced comprising additional steps of utilizing highly directional receiver antennae for respective receivers and aiming the antennae at the common transmitter.

17. The method of claim 15 further comprising providing the common transmitter with means for delivering signals to contiguous markets adjacent to the primary market, whereby additional areas reachable by the common transmitter are created subject to regulation and charge of a licensing fee by a licensing authority.

18. The method of claim 17 further comprising providing the central transmitting facility with means for broadcasting to selected non-contiguous, remote markets.

19. The method of claim 18 for providing the ability to a broadcast station to create demographic broadcast coverage by selectively assembling contiguous and remote broadcast markets comprising the steps of directing the composite signal to selected elements of an antenna delivering a signal from the common transmitter.

20. A system producing a composite HDTV television signal for broadcasting a plurality of digital broadcast stations from a common transmitter at a common broadcasting station in a market area, each broadcast television station producing a station signal, within a spectrum band of limited width compared to analog broadcast spectra which width is in correspondence with a total number of stations in a market after each station signal has been digitally compressed, comprising:

a transmitter for producing a wideband signal having the width of the spectrum band;

means for linking station signals from the broadcast stations to the common transmitter;

means for producing the composite signal having a width in accordance the spectrum band;

combining means combining the station signals to provide a packetized, digital, compressed format for transmission in a selected format within; and means within the combining means creating at least a permanent virtual signal circuit having a virtual channel address for each station signal.

21. A system defining a primary market for a plurality of broadcast stations, each providing a station signal, comprising;

a common transmitter having a broadcast radius, the broadcast radius corresponding to a primary market area licensed by a licensing authority;

link means for linking each station signal to the common transmitter;

combining means for combining the station signals in to a composite signal, said combining means further comprising means for combining both analog and digital broadcast station signals in the composite signal; and a common antenna for broadcasting the composite signal.

22. The system according claim 21 further comprising means for receiving the composite comprising receivers and highly directional receiver antennae for respective receivers, said antennae being aimed at the common transmitter.

* * * * *